(12) United States Patent
Hiligsmann et al.

(10) Patent No.: US 6,580,269 B2
(45) Date of Patent: Jun. 17, 2003

(54) MAGNETIC SENSING DEVICES AND SYSTEMS

(75) Inventors: Vincent Hiligsmann, Chenee (BE); Rudi DeWinter, Heusden Zolder (BE); Adrian Hill, Channel Islands (GB)

(73) Assignee: Melexis UK Ltd., Ieper (BE)

(*) Notice: Subject to any disclaimer, the term of this patent is extended or adjusted under 35 U.S.C. 154(b) by 0 days.

(21) Appl. No.: 09/836,588

(22) Filed: Apr. 16, 2001

(65) Prior Publication Data

US 2002/0008513 A1 Jan. 24, 2002

Related U.S. Application Data

(60) Provisional application No. 60/197,853, filed on Apr. 14, 2000.

(51) Int. Cl.[7] .............................................. G01R 33/06
(52) U.S. Cl. ................................... 324/251; 324/207.23
(58) Field of Search ........................ 324/207.2, 207.12, 324/207.24, 251, 252, 207.23, 207.11, 207.22; 74/53, 56; 327/510, 511

(56) References Cited

U.S. PATENT DOCUMENTS

| 5,541,506 A | 7/1996 | Kawakita et al. |
| 5,572,058 A | 11/1996 | Biard |
| 5,612,618 A * | 3/1997 | Arakawa ............... 324/207.25 |
| 5,657,189 A * | 8/1997 | Sandhu ........................ 360/112 |
| 5,694,038 A | 12/1997 | Moody et al. |
| 5,831,513 A | 11/1998 | Lue |
| 5,942,895 A | 8/1999 | Popovic et al. |
| 6,064,199 A * | 5/2000 | Walter et al. ............ 324/207.2 |

FOREIGN PATENT DOCUMENTS

| EP | 0 875 733 A2 | 4/1998 |

* cited by examiner

*Primary Examiner*—Edward Lefkowitz
*Assistant Examiner*—Subhash Zaveri
(74) *Attorney, Agent, or Firm*—Townsend and Townsend and Crew LLP; Gerald T. Gray

(57) ABSTRACT

Systems and methods for detecting the magnetic field created by a magnetic target. An arrangement of multiple magnetic field sensing elements and circuit elements configured to select and/or interpolate between the sensing elements to give enhanced performance and to compensate for external mechanical factors. The circuit arrangement is integrated on a single silicon chip to form an integrated circuit sensing device in one embodiment.

30 Claims, 6 Drawing Sheets

At "zero" position

At full deflection

MAGNETIC SENSING DEVICES AND SYSTEMS

CROSS-REFERENCES TO RELATED APPLICATIONS

This application is related to, and claims priority from, U.S. Provisional Patent Application Ser. No. 60/197,853, filed Apr. 14, 2000, entitled "DISTRIBUTED HALL-EFFECT SENSOR," the disclosure of which is hereby incorporated by reference in its entirety.

BACKGROUND OF THE INVENTION

The present invention relates in general to sensing devices for detecting magnetic fields, and more particularly to magnetic field sensing devices including multiple sensing elements such as hall effect based sensing elements.

A sensing device including a hall effect sensing element can be configured to detect the presence or absence of magnetic material. If used in conjunction with an appropriately place biasing magnet such a sensing element can be configured to detect the presence or absence of metals such as a tooth on a gear wheel. Sensors including such sensing elements are used to determine the position of CAMs and crankshafts in a modern gasoline or diesel internal combustion engine, or other mechanical linkages and rotating components.

In some applications, the positions are determined by switching (e.g., on or off) at a certain measurement point. For example, in some applications, the sensing element is configured to switch on or off depending on the strength of the detected magnetic field relative to a threshold value. In other applications, the sensor is configured to return an analogue signal indicative of mechanical position of the target object. For example, the sensor may provide a voltage signal proportional to the strength of a detected magnetic field.

The performance requirements of such systems can be demanding. The limits of accuracy and repeatability of the detection or measurement can be dominated by mechanical factors such as alignment, dimensional tolerances, assembly variation and wear.

SUMMARY OF THE INVENTION

Systems and methods for detecting the magnetic field created by a magnetic target are provided. A sensing device according to the invention includes an arrangement of multiple magnetic field sensing elements and circuit elements configured to select and/or interpolate between the sensing elements to give enhanced performance and to compensate for external mechanical factors. The circuit arrangement is integrated on a single silicon chip to form an integrated circuit sensing device in one embodiment.

According to the invention, a multiple sensing element arrangement is used together with control, selection and interpolation circuitry to improve the performance of Hall effect sensors and to allow for external mechanical tolerances and drifts to be determined and compensated. Digital memory is used to store measured and computed values for compensation.

According to an aspect of the present invention, a magnetic sensing device implemented on a single integrated circuit is provided. The device typically includes two or more magnetic sensing elements, wherein each sensing element is configured to produce an output signal based on the magnetic field detected by the sensing element, selection means for selecting the output signal of one or more of the sensing elements, and processing means for receiving the one or more selected output signals and for producing a sensing device output signal based on the one or more selected output signals. The device also typically includes control means for controlling the selection means to select the output signals of the sensing elements, and for controlling the processing means to execute an algorithm for processing of the selected output signals.

According to another aspect of the present invention, a magnetic sensing device is provided that typically includes a plurality of magnetic sensing elements, selection circuitry, control circuitry and processing circuitry implemented onto a single integrated circuit and configured such that an output of the sensing device is determined by the processing circuitry as a function of one or more of the outputs of the individual sensing elements.

According to yet another aspect of the present invention, an integrated magnetic sensing device implemented on a single silicon chip is provided. The device typically includes two or more magnetic sensing elements, wherein each sensing element is configured to produce an output signal based on the magnetic field detected by the sensing element, and a circuit arrangement configured to produce a sensing device output signal based on the output signals of one or more of the magnetic sensing elements.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
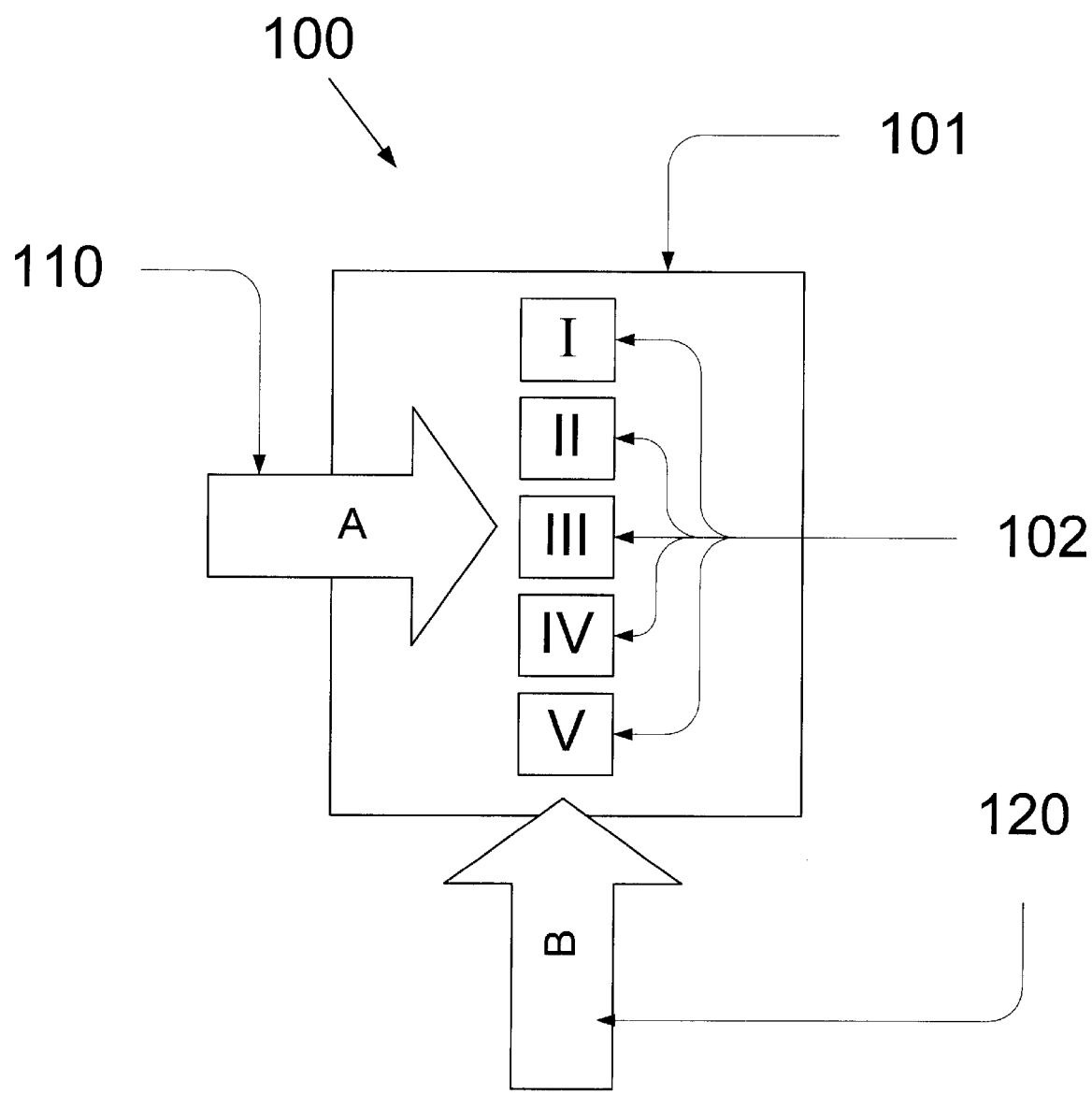
FIG. 1 shows an arrangement of a line of sensing elements according to an embodiment of the present invention.

FIG. 1 illustrates a sensing device 100 including multiple magnetic field sensing elements 102 arranged in a linear array according to an embodiment of the invention. The magnetic sensing elements of the present invention, including sensing elements 102, each preferably include a Hall effect based sensing element that includes, for example, a Hall plate and associated circuitry for generating a signal representing a detected magnetic field. In one embodiment, each sensing element produces an output signal having one of two values dependent upon the magnitude of the magnetic field experienced by the sensing element. For example, in one embodiment, each Hall effect sensing element is configured to generate an output signal having a binary value, e.g., 0 or 1, depending on the magnitude of the detected magnetic field. The sensing elements may be unipolar or bipolar and may operate as a switch or a latch. It should be appreciated that, although five sensing elements are shown, any number, N, of sensing elements, or as few as two sensing elements, may be used for this and other embodiments.

The sensing elements 102 are also preferably integrated onto a single silicon chip 101 so as to form an integrated sensing device. As shown in FIG. 1, sensing elements 102 are arranged in a straight line parallel to one side of the integrated circuit 101 according to one embodiment. It should be appreciated that the sensing elements 102 react to the magnetic field associated with the target material whose position is being sensed. If the movement of the target is along the direction indicated by the arrow 110 marked "A", e.g., perpendicular to the linear array of sensing elements 102, the magnetic field sensed by each sensing element 102 varies as a function of the position of the sensing element 102 relative to the actual path of the magnetic target. For example, if the path 110 of the target crosses sensing element "III", sensing elements "I" and "V" will experience magnetic fields having reduced strength relative to the magnetic fields experienced by sensing elements "II" and "IV". Thus, if the length (e.g. element "I" to element "V" distance) of the array of sensing elements 102 is greater than the variation in the path 110 of the target then at least one of the sensing elements 102 will be optimally positioned to generate the most accurate signal.

In this first configuration, with the direction 110 of the movement of the target substantially perpendicular to the array of sensing elements 102, the selection of the sensing element 102 that is best positioned to detect the target can be performed in several ways. As the magnetic field falls off in magnitude with increasing distance from the target, the sensing element 102 in the optimum position is exposed to a stronger magnitude field than other sensing elements 102 that are further from the target. If all the sensing elements 102 have similar sensitivities, the optimally placed sensing element 102 will be exposed to a magnetic field sooner and for a longer duration. In one embodiment, the optimum sensing element is selected based on the time order in which the sensing elements detect magnetic fields above a defined threshold. In another embodiment, the optimum sensing element is selected by determining a group of contiguous sensing elements in which each produces a signal determining the passage of the magnetic target across the integrated circuit and selecting the element that is physically central to the selected group.

The selection process is performed by a circuit arrangement that is coupled to the sensing elements, and which includes circuitry configured to control parameters of the sensing elements, and associated circuitry. Such associated circuitry includes, for example, such elements as amplifiers for gain or offset control, threshold circuits to determine when the amplitude of the magnetic field exceeds a given threshold value and other conditioning circuitry well known in the field of magnetic sensors. The circuit arrangement is preferably integrated onto a single silicon chip with the sensing elements, although some or all components of the circuit arrangement may be "off-chip." Although such a circuit arrangement is not shown in FIG. 1, such a circuit arrangement configured to implement the selection and control process is described in more detail below with reference to FIG. 4.

In a second configuration, the direction of motion of the target is substantially parallel to the array of the sensing elements 102 shown as direction along the arrow 120 marked "B" in FIG. 1. In this configuration, the accuracy of the mechanical alignment between the path 120 of the target and the array of the sensing elements 102 is not compensatable, but instead the accuracy of the timing is adjusted by selection of one of the sensing elements 102. Such an arrangement allows selection of the optimum sensing element to compensate for mechanical tolerances between the exact position of the magnetic target relative to the position of the mechanical device whose position is being measured or determined.

Figure 2:
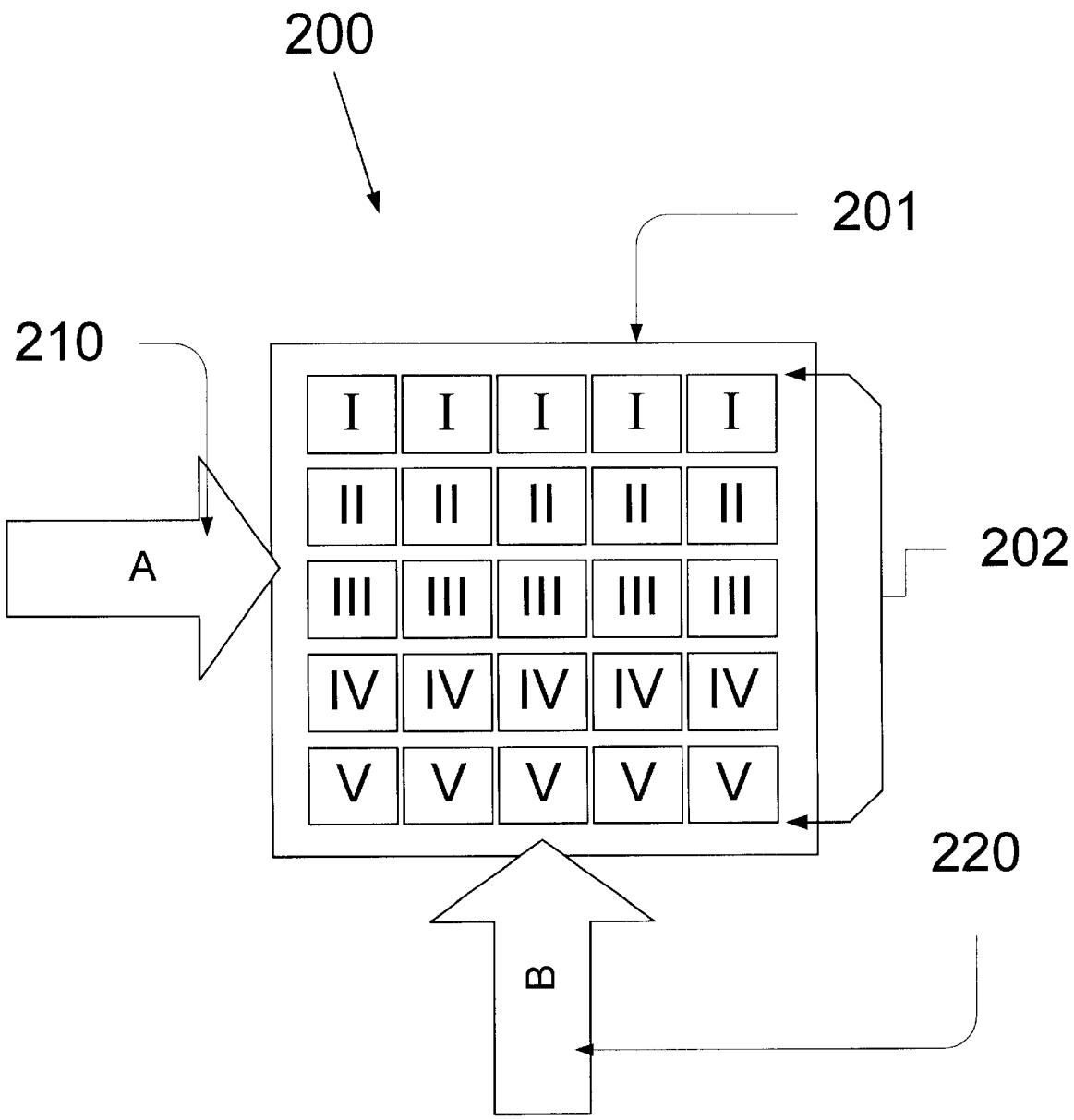
FIG. 2 shows an arrangement of an array of sensing elements according to an embodiment of the present invention.

It should be appreciated that both of the above configurations can effectively be combined in a single integrated circuit comprising a two dimensional array of sensing elements. FIG. 2 illustrates an example of a sensing device 200 including a two dimensional array of sensing elements 202 according to an embodiment of the present invention. The sensing elements 202 are preferably arranged to present multiple linear arrays of sensing elements perpendicular to the path of the target and also multiple linear arrays of sensing elements parallel to the path of the target. For example, as shown in FIG. 2, each linear array of sensing elements having the same numeral reference (e.g., "II") are parallel to the direction 210 and perpendicular to the direction 220. In one embodiment, selection of a sensing element in a linear array perpendicular to the path of the target also selects all the elements in the line parallel to the path such that optimum selection is carried out for both position and timing. For example, if sensing element "II" of one linear array of sensing elements "I" to "V" perpendicular to the direction 210 of the target is selected as the optimum sensing element, all the sensing elements marked "II" are also selected.

Figure 3:
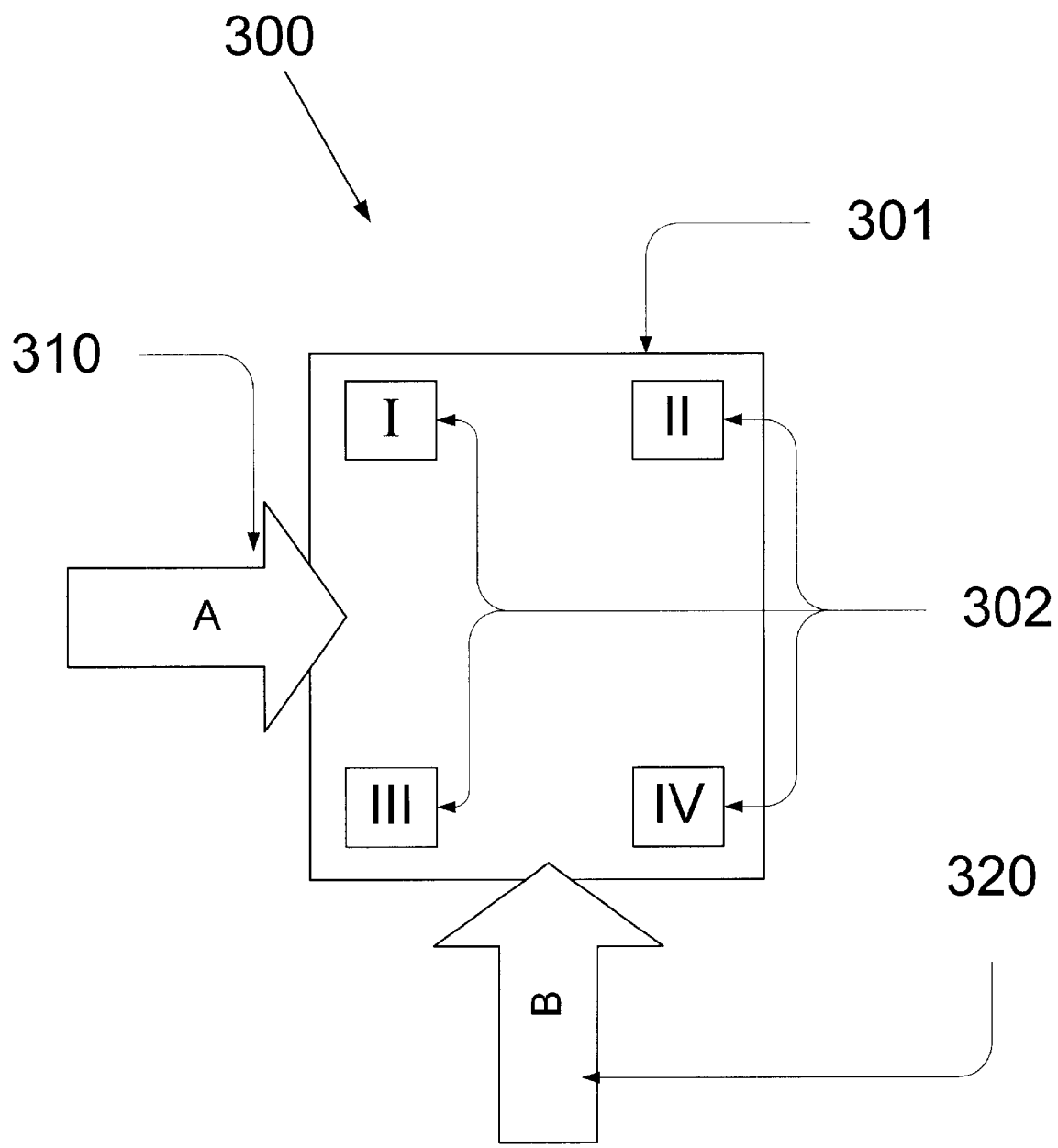
FIG. 3 shows an arrangement of four sensing elements according to an embodiment of the present invention.

FIG. 3 illustrates a sensing device 300 including four sensing elements 302 arranged at the four corners of a rectangle according to another embodiment of the present invention. In the present embodiment, sensing elements 302 each preferably produce an analogue signal, e.g., a voltage signal, representative of the magnetic field detected. With four such analogue sensing elements arranged at the four corners of a rectangle as shown in FIG. 3, as the magnetic target passes across the surface of the sensing device 300, each sensing element 302 detects a differently varying magnetic field. By comparing and interpolating the four signals generated by the four sensing elements 302, a sensing device output signal is generated that best meets the needs of the application.

Figure 4:
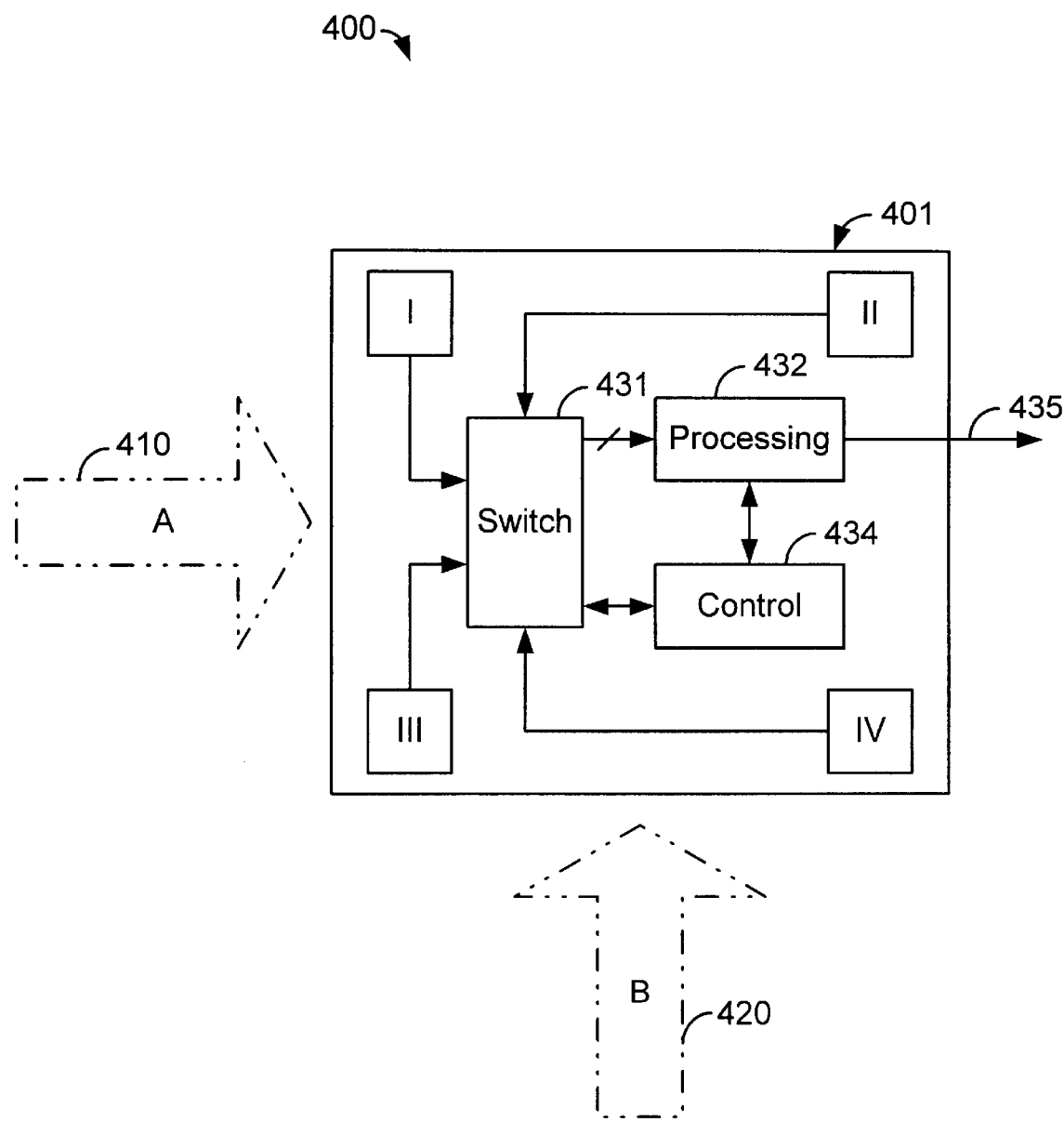
FIG. 4 shows an arrangement of four sensing elements together with control, switching and processing circuitry according to an embodiment of the present invention.

FIG. 4 illustrates a sensing device 400 similar to sensing device 300 of FIG. 3, including a circuit arrangement for selecting, comparing and interpolating the sensing element output signals for an arrangement of four sensing elements according to an embodiment of the present invention. As shown, sensing device 400 includes a switching circuit 431 configured and arranged to selectively connect the output of one or more of the sensing elements 402 to the processing circuit 432. A control circuit 434 is configured and arranged to control the switching circuit 431 to selectively connect one or more of the sensing elements 402 to the processing circuit 432 as is required for the particular application. Processing circuit 432 receives the signals from the selected and connected sensing elements and produces the desired output signal 435 based upon algorithms or decision systems as determined by the application. These algorithms or decision systems are preferably implemented using a microcontroller, microprocessor, reconfigurable logic, or fixed logic or some combination of such circuitry, with the application specific variables determined and stored using any of several well-known memory means such as a digital non-volatile memory unit. Control circuit 434, in one embodiment, is configured to receive control and data signals from external intelligence.

In one embodiment of the invention, the control circuit 434 is configured to adjust downwards the gains of the sensing element to better allow differentiation between the sensing elements and to better enable selection of the optimum sensing element. The gains are then adjusted back to normal levels before a sensing element is used. By comparing and interpolating the four signals generated by the four sensing elements, processing circuit 432 generates a sensing device output signal 435 that best meets the needs of the application.

Figure 5:
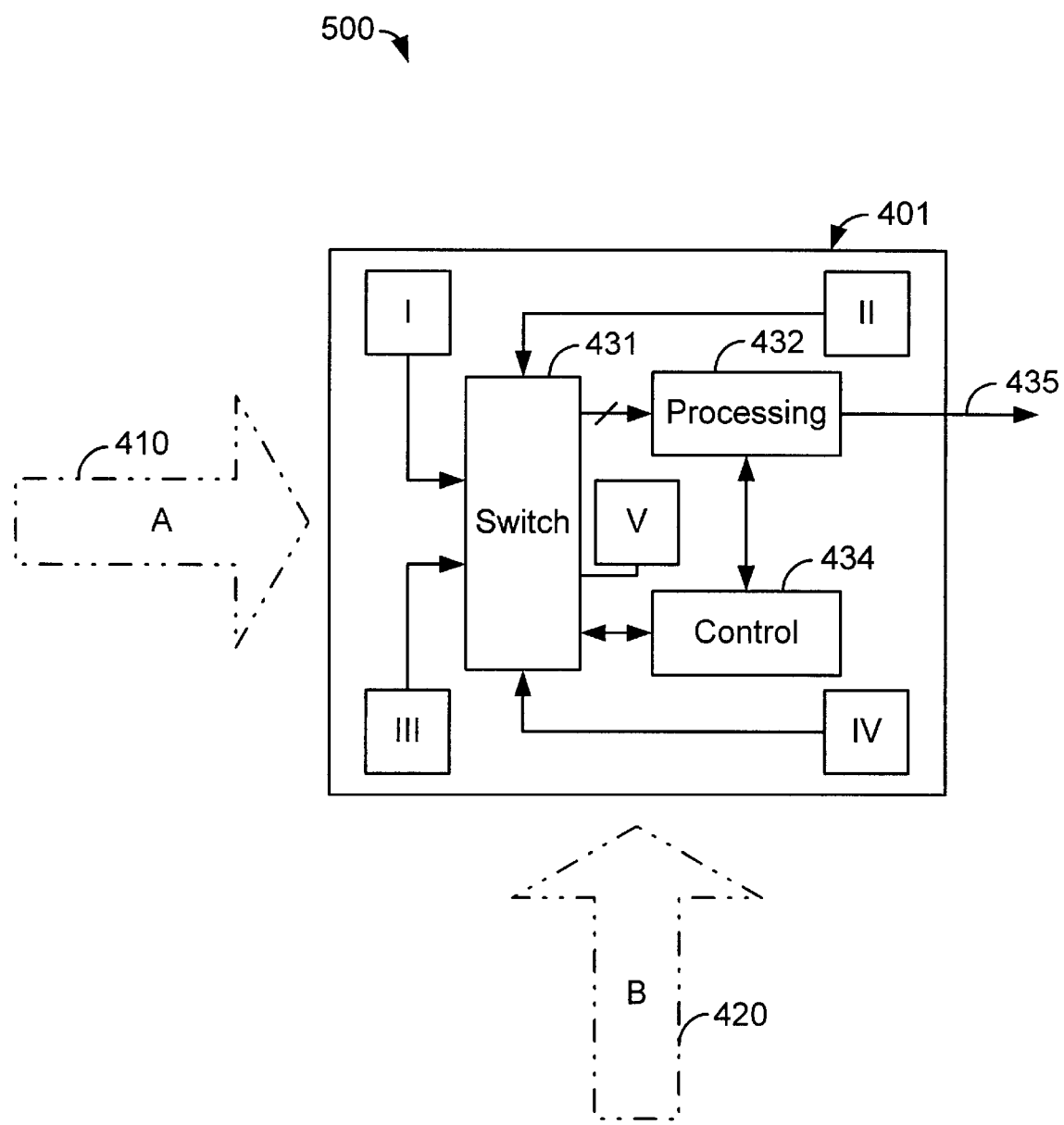
FIG. 5 shows an arrangement of sensing elements according to another embodiment of the present invention.

In a further embodiment of the invention, a magnetic target is attached to a mechanism such as that found in a wing mirror (e.g., adjustable door mirror) on an automobile wherein the magnetic target rotates about a pair of orthogonal axes in the plane of an array of sensing elements. The magnetic field thus varies not by lateral motion of the magnetic target relative to the array, but by differential changes in the distances between the ends of the magnetic target and each sensing element in the array of sensing elements. The signals generated by the sensing elements are used to determine the angle of movement of the magnetic target and thus the angle of movement of the reflective surface in the mirror. FIG. 5 shows a sensing device 500 similar to sensing device 400 but with the addition of one or more sensing elements (e.g., labelled "V") positioned centrally on the silicon die and also connected to the switching circuitry 431. The sensing element(s) substantially in the centre of the array generates a signal that is substantially constant over the limited rotational movement of the magnetic target. This substantially constant signal is used by the processing element as a reference signal in one embodiment. Such a reference signal is generally affected by external affects, for example temperature changes, in the same way as the other signals. Temperature changes for example, affect the strength of the magnetic field produced by the magnetic target and also the electrical characteristics of the sensing elements themselves. The changes in the reference signal are used to determine and compensate for the corresponding changes in the signals from the other sensing elements.

Figure 6A:
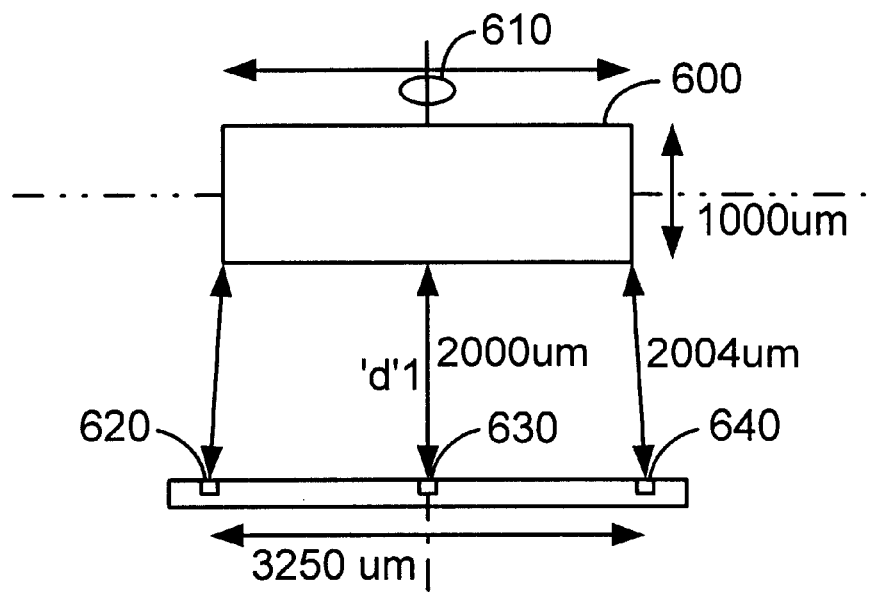
FIG. 6 illustrates a two dimensional view of a magnetic target positioned proximal three sensing elements according to one embodiment.
Figure 6B:
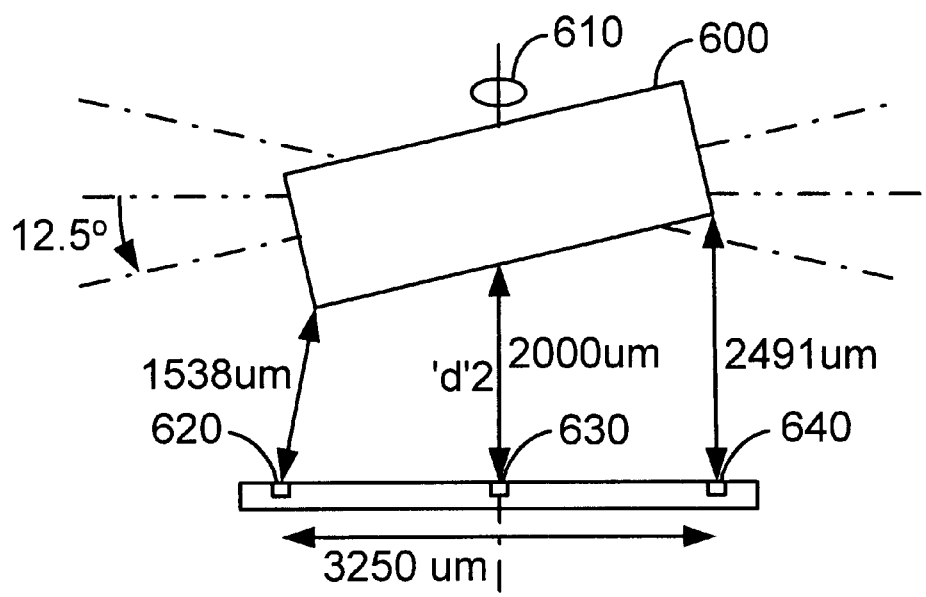

FIG. 6 illustrates a two dimensional view of a target 600 positioned proximal three sensing elements according to one embodiment. Target 600 pivots about an axis 610 as shown. As can be seen, as the target pivots, the closest distances between the target 600 and each of sensing element 620 and sensing element 640 changes depending on the amount and direction of pivot, whereas the distance between the target 600 and sensing element 630 remains substantially the same. In one embodiment as shown, target 600 has a thickness of about 1,000 $\mu$m and a length of about 3,000 $\mu$m, and the distances between the array of sensing elements and the target 600 is about 2,000 $\mu$m. It should be appreciated that other dimensions may be used. It should also be appreciated that more sensing elements are preferably used in a three dimensional embodiment as described above (e.g., FIG. 5), and that the target preferably pivots in all 360 degrees relative to axis 610.

Such a sensing configuration can also be used, for example, in determining the position of a control lever such as a joystick. In some joystick applications there is additionally implemented a control button to provide an additional input to the system to which the joystick is connected. By mounting a magnetic target onto a mechanical mechanism whose vertical position is modified by operating a control button, the sensing elements all simultaneously indicate a step change in the magnetic field strength. Such step changes typically occur at a rate of change incompatible with changes due to variations in temperature, and are used by the processing circuitry to generate a signal indicating the state of the button without the need for electrical contacts on the button or electrical connections along the shaft of the joystick.

The selection and interpolation process for all embodiments is dependent upon the application. Examples of such processes include:

A simple selection against predetermined criteria of the output of one sensing element as the best output and using just this one output alone.

A simple summation of the outputs of any two of the sensing elements, or any linear array of two or more sensing elements, in predetermined ratios, to create the effect of a virtual sensor located at a point along the axis joining the selected sensing elements.

A summation of the outputs of all sensing elements, or a subset of all sensing elements, in predetermined ratios, to create the effect of a virtual sensor anywhere in the plane of the selected sensing elements.

A determination of the desired output by comparison of the instantaneous values read from the selected sensing elements with values in a look up table or calculated from values in a look up table. The values are determined, in one embodiment, from empirical measurements or from calculations based on the mechanical and magnetic arrangement.

The processing circuit for any of the above selection and interpolation implementations can include analogue and/or digital circuitry. In one digital implementation, a microprocessor is used as both the control and processing circuit, e.g., process circuit 432 and control circuit 434, and can further be integrated with a memory, such as a non volatile memory unit, as storage for look up tables or other constants that are used for optimisation of the sensing device in the application.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A magnetic sensing device implemented on a single integrated circuit, the device comprising:

two or more magnetic sensing elements, wherein each sensing element is configured to produce an output signal based on the magnetic field detected by the sensing element;

selection means for selecting the output signal of one or more of the sensing elements;

processing means for receiving the one or more selected output signals and for producing a sensing device output signal based on the one or more selected output signals; and control means for controlling:

the selection means to select the output signals of the sensing elements; and the processing means to execute an algorithm for processing of the selected output signals.

2. A magnetic sensing device as in claim 1 wherein the magnetic sensing elements are arranged in a one dimensional array.

3. A magnetic sensing device as in claim 1 wherein the magnetic sensing elements are arranged in a two dimensional array.

4. A magnetic sensing device as in claim 1 wherein the magnetic sensing elements each produce an output signal having one of two states depending on the magnitude of the magnetic field detected by each sensing element.

5. A magnetic sensing device as in claim 1 wherein the magnetic sensing elements each produce an analogue output signal based on the magnitude of the magnetic field detected by each sensing element.

6. A magnetic sensing device as in claim 4 wherein the algorithm executed by the processing means includes a Boolean function of the two states of the selected output signals of the sensing elements selected by the selection means.

7. A magnetic sensing device as in claim 5 wherein the algorithm executed by the processing means includes an analogue function of the selected output signals of the sensing elements selected by the selection means.

8. A magnetic sensing device as in claim 1 wherein the function of the control means is determined by reconfiguration means or memory means.

9. A magnetic sensing device as in claim 1 wherein the function of the processing means is determined by reconfiguration means or memory means.

10. A magnetic sensing device as in claim 8 or 9 wherein the reconfiguration means includes one of a microcontroller and microprocessor.

11. A magnetic sensing device as in claim 8 or 9 wherein the memory means is programmed during manufacture of the memory unit.

12. A magnetic sensing device as in claim 8 or 9 wherein the memory means is programmed during manufacture of the sensing device.

13. A magnetic sensing device as in claim 8 or 9 wherein the memory means is programmed during or after installation of the sensing device.

14. A magnetic sensing device as in claim 8 or 9 wherein the memory means is programmed during a sensor calibration process.

15. A magnetic sensing device as in claim 8 or 9 wherein the memory means is programmed via a communication means from an external source.

16. The magnetic sensing device of claim 1, wherein each sensing element includes a Hall effect sensing element.

17. A magnetic sensing device comprising a plurality of magnetic sensing elements arranged in an array, and processing circuitry implemented onto a single integrated circuit and configured to generate a sensing device output signal based on a function of two or more of the outputs of the individual sensing elements, wherein said sensing device output signal represents the output of a single virtual sensor located within the array.

18. A magnetic sensing device as in claim 16, wherein the magnetic sensing elements are arranged in a one dimensional array.

19. A magnetic sensing device as in claim 16, wherein the magnetic sensing elements are arranged in a two dimensional array.

20. An integrated magnetic sensing device implemented on a single silicon chip, the device comprising:

two or more magnetic sensing elements, wherein each sensing element is configured to produce an output signal based on the magnetic field detected by the sensing element; and a circuit arrangement configured to produce a sensing device output signal based on the output signals of one or more of the magnetic sensing elements, wherein the circuit arrangement applies an interpolation algorithm to the one or more output signals to produce the sensing device output signal, wherein said sensing device output signal represents the output of a single virtual sensing device located within the integrated device as determined by the interpolation algorithm.

21. The magnetic sensing device of claim 20, wherein the circuit arrangement includes:

a selection circuit configured to select the output signal of one or more of the sensing elements in response to a selection signal;

a processing circuit configured to receive and process the one or more selected output signals and apply the interpolation algorithm to produce the sensing device output signal based on the one or more selected output signals; and a control circuit configured to provide the selection signal to the selection circuit.

22. The magnetic sensing device of claim 21, wherein the control circuit is further configured to control the process circuit to execute a specific algorithm for processing of the selected output signals.

23. The magnetic sensing device of claim 20, wherein each sensing element includes a Hall effect sensing element.

24. The magnetic sensing device of claim 23, wherein each sensing element produces an analogue signal representing the magnitude of the magnetic field detected by the sensing element.

25. The magnetic sensing device of claim 23, wherein each sensing element produces a digital signal having one of two states depending on the magnitude of the magnetic field detected by the sensing element.

26. A magnetic sensing device as in claim 20, wherein the magnetic sensing elements are arranged in a one dimensional array.

27. A magnetic sensing device as in claim 20, wherein the magnetic sensing elements are arranged in a two dimensional array.

28. The device of claim 17, wherein the function is a weighted average of the two or more of the outputs of the individual sensing elements.

29. The device of claim 17, wherein the processing circuitry determines said sensing device output signal by interpolating the outputs of the individual sensing elements.

30. The device of claim 17, wherein the processing circuitry includes control circuitry and selection circuitry, wherein the control circuitry controls the selection circuitry to select said two or more of the outputs of the sensing elements to be processed to determine the sensing device output signal.

* * * * *